United States Patent
Marietta et al.

(10) Patent No.: US 6,754,752 B2
(45) Date of Patent: Jun. 22, 2004

(54) MULTIPLE MEMORY COHERENCE GROUPS IN A SINGLE SYSTEM AND METHOD THEREFOR

(75) Inventors: Bryan D. Marietta, Austin, TX (US); Peter J. Wilson, Leander, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 477 days.

(21) Appl. No.: 09/758,856

(22) Filed: Jan. 11, 2001

(65) Prior Publication Data

US 2001/0025328 A1 Sep. 27, 2001

Related U.S. Application Data

(60) Provisional application No. 60/175,856, filed on Jan. 13, 2000.

(51) Int. Cl.[7] .......................... G06F 12/00; G06F 13/22
(52) U.S. Cl. ...................................... 710/200; 710/220
(58) Field of Search ................................ 710/200, 220, 710/240, 241, 242, 243, 244; 712/29

(56) References Cited

U.S. PATENT DOCUMENTS

| | | | |
|---|---|---|---|
| 5,303,362 A | | 4/1994 | Butts, Jr. et al. |
| 5,630,166 A | * | 5/1997 | Gamache et al. ............. 712/29 |
| 5,829,034 A | | 10/1998 | Hagersten et al. |
| 5,870,560 A | * | 2/1999 | Zulian ........................ 709/225 |
| 5,960,179 A | | 9/1999 | Hagersten |
| 6,185,647 B1 | * | 2/2001 | Shibuya ...................... 710/107 |
| 6,295,553 B1 | * | 9/2001 | Gilbertson et al. ......... 709/207 |
| 6,411,236 B1 | * | 6/2002 | Kermani ..................... 341/141 |

OTHER PUBLICATIONS

U. S. Provisional Application 60/175,856, filed by Bryan D. Marietta on Jan. 13, 2000 entitled, Rio Bus Protocol.

\* cited by examiner

Primary Examiner—Tim Vo
(74) Attorney, Agent, or Firm—Robert L. King

(57) ABSTRACT

A multi-processing system (10) comprises a plurality of groups, each having an arbitrary number of processing systems (11, 12). Memory coherency may or may not be established within any particular group. However, each group is intentionally arranged by functionality so that memory coherency, if implemented, only needs to be maintained within the group. Information transfers between two groups are therefore non-coherent by definition. Memory coherency implementation is significantly reduced in the system. A transaction format utilizes group and processing system identifiers to implement the simplified coherency scheme.

13 Claims, 9 Drawing Sheets

| ATTRIBUTES | TRANSACTION TYPE | ADDRESS | DATA (IF REQUIRED) |
|---|---|---|---|

*FIG.3*

| ATTRIBUTES | TRANSACTION TYPE | SOURCE ADDRESS | | TARGET ADDRESS | | DATA (IF REQUIRED) |
|---|---|---|---|---|---|---|
| | | GROUP NUMBER | PROCESSING SYSTEM | GROUP NUMBER | PROCESSING SYSTEM ADDRESS | |

*FIG.4*

| SOURCE IN SAME GROUP AS TARGET? | TARGET IS A COHERENT GROUP? | LOCAL TRANSACTION | FABRIC TRANSACTION |
|---|---|---|---|
| YES | YES | COHERENT READ | COHERENT READ |
| YES | YES | NON-COHERENT READ | NON-COHERENT READ |
| YES | NO | COHERENT READ | ERROR |
| YES | NO | NON-COHERENT READ | NON-COHERENT READ |
| NO | YES | COHERENT READ | I/O READ |
| NO | YES | NON-COHERENT READ | NON-COHERENT READ |
| NO | NO | COHERENT READ | ERROR |
| NO | NO | NON-COHERENT READ | NON-COHERENT READ |
| YES | YES | COHERENT WRITE | COHERENT WRITE |
| YES | YES | NON-COHERENT WRITE | NON-COHERENT WRITE |
| YES | NO | COHERENT WRITE | ERROR |
| YES | NO | NON-COHERENT WRITE | NON-COHERENT WRITE |
| NO | YES | COHERENT WRITE | I/O WRITE |
| NO | YES | NON-COHERENT WRITE | NON-COHERENT WRITE |
| NO | NO | COHERENT WRITE | ERROR |
| NO | NO | NON-COHERENT WRITE | NON-COHERENT WRITE |

*FIG. 8*

| SOURCE IN SAME GROUP AS TARGET? | TARGET IS A COHERENT GROUP? | LOCAL TRANSACTION | FABRIC TRANSACTION |
|---|---|---|---|
| YES | YES | COHERENT READ | COHERENT READ |
| YES | YES | NON-COHERENT READ | NON-COHERENT READ |
| YES | NO | COHERENT READ | ERROR |
| YES | NO | NON-COHERENT READ | NON-COHERENT READ |
| NO | YES | I/O READ | I/O READ |
| NO | YES | NON-COHERENT READ | NON-COHERENT READ |
| NO | NO | COHERENT READ | ERROR |
| NO | NO | NON-COHERENT READ | NON-COHERENT READ |
| YES | YES | COHERENT WRITE | COHERENT WRITE |
| YES | YES | NON-COHERENT WRITE | NON-COHERENT WRITE |
| YES | NO | COHERENT WRITE | ERROR |
| YES | NO | NON-COHERENT WRITE | NON-COHERENT WRITE |
| NO | YES | I/O WRITE | I/O WRITE |
| NO | YES | NON-COHERENT WRITE | NON-COHERENT WRITE |
| NO | NO | COHERENT WRITE | ERROR |
| NO | NO | NON-COHERENT WRITE | NON-COHERENT WRITE |

*FIG.10*

MULTIPLE MEMORY COHERENCE GROUPS IN A SINGLE SYSTEM AND METHOD THEREFOR

RELATED APPLICATIONS

This nonprovisional patent application claims a right of priority and the benefit of Provisional U.S. Patent Application Serial No. 60/175,856 filed Jan. 13, 2000 entitled "Rio Bus Protocol" by Bryan Marietta pursuant to 35 U.S.C. §119(e).

FIELD OF THE INVENTION

The present invention relates to systems with multiple processing devices and, more particularly, to memory coherency in such systems.

BACKGROUND OF THE INVENTION

Information processing systems have evolved to the point of requiring many tightly coupled processors. Each processor can be viewed as a separate system which is coupled by a global bus or interconnect structure. In such systems, each processor system typically has a main memory device and one or more separate cache memories. As such systems evolved, the preferred implementation is to have a fully coherent memory system. For example, cache coherency is expected when programming pursuant to Unix-style multiprocessor software conventions. A disadvantage with fully coherent memory systems is the expense and delay associated with the additional processing required to maintain such systems fully coherent. As the number of processors increases in a system, the degree of complexity in ensuring coherency also increases. An example of a multiprocessor computer system which utilizes cache coherency management protocols is taught in U.S. Pat. No. 5,303,362. The requirement to maintain coherency throughout the system imposes a requirement to broadcast all coherence traffic and that imposes an undesirable load on the global interconnect and uninterested processing elements.

In yet other systems, software is used to make devices having memory which is inherently incoherent to be coherent with other memory in the system. Performance is often degraded as time is required for a software routine to identify and retrieve a most current piece of data. The software execution associated with identifying and resolving memory coherency issues also increases system overhead and slows operational speed.

In multi-processing systems using a variety of processing elements, the entire system has previously been viewed as a single entity from a memory coherency standpoint. Therefore, cache coherency issues affect each and every processing element of known systems. For the reasons above and the continued demand to interconnect more and more processing devices, a more efficient memory coherency methodology is desired.

BRIEF DESCRIPTION OF THE DRAWINGS

FIG. 3 illustrates in layout form the format of a local transaction communicated within the processing system of FIG. 2 in accordance with the present invention;

FIG. 4 illustrates in layout form the format of a fabric transaction communicated within the system of FIG. 1 in accordance with the present invention;

FIG. 8 illustrates in table form transaction mappings done by the transaction mapper of the output section of the system interface of FIG. 5.

FIG. 10 illustrates in table form transaction mappings done by the transaction mapper of the input section of FIG. 9.

DETAILED DESCRIPTION OF THE DRAWINGS

Figure 1:
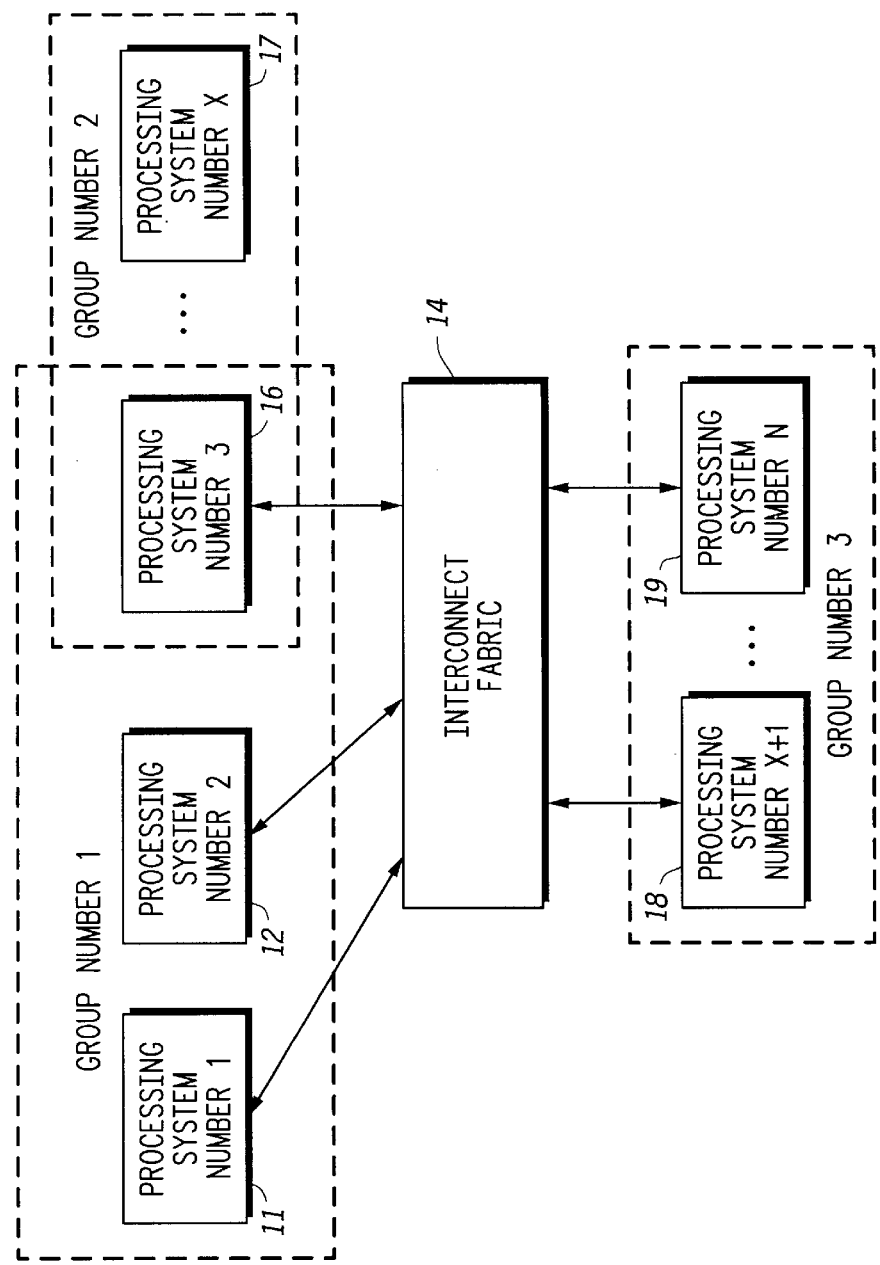
FIG. 1 illustrates in block diagram form an example of a multiple processing system in which the present invention may be utilized.

FIG. 1 illustrates a multi-processing system 10 having a variety of processing systems which are arranged in a plurality of groups. In this context, a group is an arrangement of processing elements based upon the required functionality of the multi-processing system 10. It should be well understood that the embodiment of FIG. 1 is exemplary only and the present invention may be used in many differing multi-processing architectures. Additionally, the present invention may be used in a multiple processing system in which the same processing system is grouped into two or more groups. Each group may be jointly cache memory-coherent, jointly non-coherent or a combination thereof. Multiprocessing system 10 has a plurality M of groups of processing elements. In the illustrated form, M is arbitrarily chosen to equal three. Group number one has three processing systems, a first processing system 11, a second system 12, and a third processing system 16 which is also a member of a second group. The second group is identified as having multiple processing systems such as processing system 16 through an Xth processing system 17. Each of processing systems 11, 12, 16 and 17 is coupled via an interconnect referred to as Interconnect Fabric 14. It should be understood that Interconnect Fabric 14 includes all the conductors coupling each of the processing systems in multi-processing system 10. Interconnect Fabric 14 may be implemented as a global bus structure or as one or more interconnect devices. As a global bus, the structure may be implemented either as a plurality of bus conductors or as a multi-segment bus. A third group of processing systems is illustrated in FIG. 1 having multiple processing systems such as an (X+1)th processing system 18 through an Nth processing system 19, where X and N are integers. Each of processing systems 18 and 19 is connected to the Interconnect Fabric 14.

In operation, multi-processing system 10 functions as a single, tightly coupled system to communicate information between any of the processing systems within any one of the illustrated groups and also functions to communicate information between processing systems in differing groups. In this context, the term 'tightly coupled' means that the time required to communicate between any two processing systems anywhere in the system is a small multiple (i.e. generally less than a factor of ten) of the time required for any processor of a processing system in the system 10 to talk to its local memory. However, it should be understood that the present invention may also be used in systems where the time required to communicate between any two connections is greater than the factor of ten. Also, the present invention may and likely will be used in systems in which different portions of the system have differing access times between any two connections.

As an example of system operation, processing system 11 may either write information to or read information from processing system 12 using the interconnect fabric 14. Such communications between processing system 11 and processing system 12 may alter caches (not shown) or main memory (not shown) of each processing system and typically a coherency mechanism is used to maintain memory coherency within group number one. However, the communication and control functionality associated with implementing the memory coherency of group number one is not disruptive to any elements of processing systems in any other group outside of group number one as will be further explained below.

Additionally, any processing system of group number three, such as the Nth processing system 19, and processing system 11 of group number one may frequently communicate information via the interconnect fabric 14. Prior multiprocessor systems desiring to have memory coherency anywhere in the system would typically implement memory coherency by treating the entire multiprocessing system 10 as a single group and globally implementing the coherency. Global memory coherency treatment significantly increases the amount of coherence protocol traffic associated with a multi-processing system which has a large number of processing systems. We have recognized that a multi-processing system may be implemented by dividing processing systems by functionality and operating requirements to create multiple groups in a single system. Memory coherency may then be maintained separately within each of the groups rather than within the entire system. As discussed below, this functionality is achieved by using a protocol which explicitly contains information to specify addressable groups and processing systems within groups. There are numerous and varied implementations which can be created to implement the protocol. As an example only, the protocol may be implement by using encoded fields which distinguish transaction information by group number and processing system within a group and type of coherency.

Figure 2:
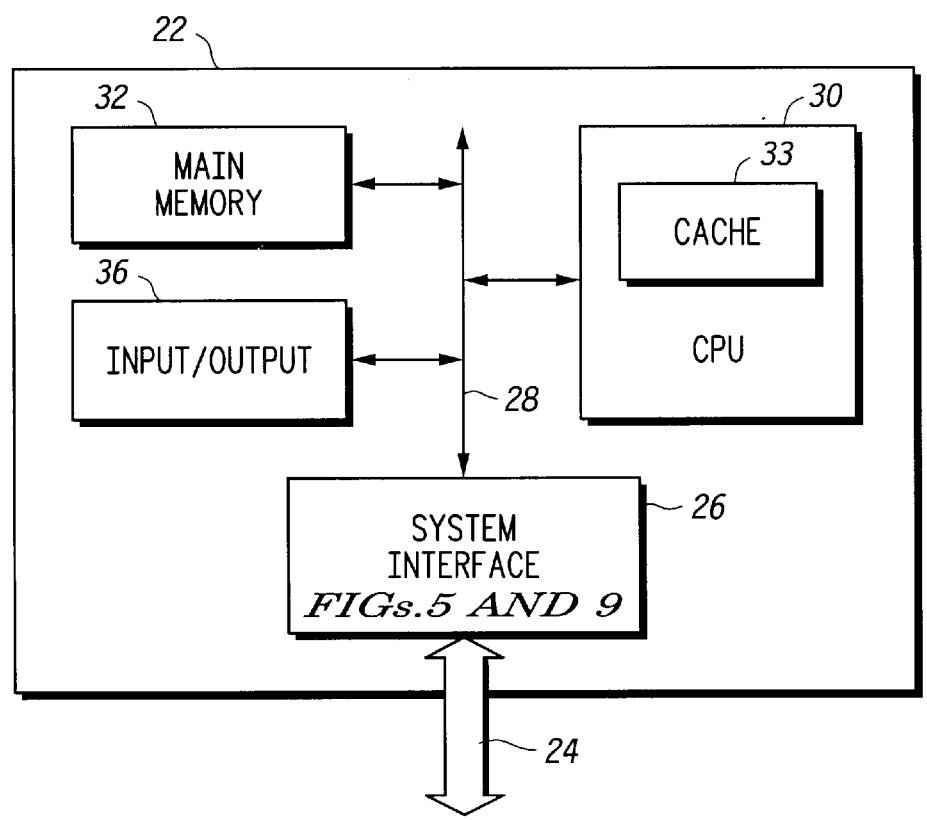
FIG. 2 illustrates in block diagram form an exemplary architecture of one processing system in which the present invention may be used.

Illustrated in FIG. 2 is a block diagram of one of numerous instantiations of a processing system 22 which uses the present invention and which may be used to implement each of the processing systems illustrated in FIG. 1. Processing system 22 has a system interface 26 which has a first input/output (I/O) terminal connected to a portion 24 of the interconnect fabric 14 of FIG. 1. A second input/output (I/O) terminal of system interface 26 is connected to a local interconnect 28. It should be readily understood that local interconnect 28 is a multiple conductor interconnect. A central processing unit (CPU) 30 has an input/output terminal connected to local interconnect 28. A main memory 32 has an input/output terminal connected to local interconnect 28. Central processing unit 30 has a smaller memory storage in the form of cache 33. An Input/Output unit 36 has an input/output terminal connected to local interconnect 28. Processing system 22 is shown with one CPU 30, one cache 33, one I/O unit 36 subsystem and one memory system, such as main memory 32. However, it should be well understood that processing system 22 may be implemented for use with the present invention with none of any particular one of those elements or with any number of such elements.

The central processing unit 30 performs a number of predetermined calculations. The central processing unit 30 utilizes cache 33 for a fast interface to information which needs to be written or read. When the required information does not exist in cache 33, a slower access to main memory 32 is required via local interconnect 28. The Input/Output unit 36 functions to interface central processing unit 30 and main memory 32 with other circuitry (not shown) such as a monitor, a keyboard, etc. Within processing system 22, any device which may generate a transaction shall be defined as an "agent". An agent may have addressable internal resources. For example, the internal resources of main memory 32 include its component bytes or words. Therefore, main memory 32, CPU 30, System Interface 26 and Input/Output unit 36 are each an agent. Agents within the processing system 22 issue and receive local transactions which are operations which pass through the local interconnect 28 from one agent to another. Local transactions may target agents both within and outside the processing system 22. When such a transaction addresses targets outside of processing system 22, the system interface 26 will recognize this by evaluating the transaction, capturing the transaction and creating an appropriate outgoing fabric transaction in a form illustrated below. There are numerous methods which may be used to evaluate the transaction within system interface 26. For example, the evaluation may include static address space partitioning, use of explicit information included within the local transaction, a computation using mapping information available to the system interface 26, or a combination of these or other methods. Multi-processing system 10 may use any one of a variety of implementations to manage the local transactions so that those transactions which target other processing systems are captured and managed appropriately. For example, multi-processing system 10 may be constructed so that the system interface 26 of one particular processing system captures all local transactions generated by the agents within that processing system and returns to an agent therein those transactions which target it. Alternatively, a particular processing system, such as processing system 11, may generate transactions targeted at other processing systems in such a manner that they are so marked when generated, so that system interface 26 simply captures appropriately-marked transactions. Yet alternatively, system interface 26 may wait to discover whether any agent within the local processing system of a defined group accepts a local transaction, and capture those which are not so accepted.

As stated above, there are various functions implemented by the transactions which are communicated within processing system 22. One of those functions involves the reading and writing of memory while maintaining coherency between the main memory 32 and the cache 33. Additionally, another function is to maintain memory coherency between cache 33 and memory and caches in other processing systems. Such coherence is maintained only between processing systems which are members of the same group. In general, most processing systems are required to maintain memory coherency in order to use the most common software operating systems. There are various known memory coherency techniques that may be used to keep coherent data in the storage locations of main memory 32 and cache 33 which have the same address.

Illustrated in FIG. 3 is a representation of the contents of a local transaction as described above. In the illustrated form, the local transaction contains four fields respectively containing predetermined attributes, a transaction type, a target address, and data if data is required. Included within the attributes field is a number of various identifiers which are not relevant to the present discussion. The transaction type field includes information about whether the transaction is a read operation, a write operation, or other types of operation such as responses and cache management operations and includes information about the coherency behavior of the transaction, for example whether a read transaction is or is not coherent. The target address field includes information to sufficiently identify the target agent and its desired internal resource. The data field, when present, contains data for the target agent. Some transaction types, such as a read request, do not require data to be present.

Each transaction specified by the transaction type field may be one of the following: a coherent read, an incoherent read, a coherent write, an incoherent write, an I/O read, an I/O write or other. Other transactions—such as messages changing coherency properties or configuration of the system are not relevant to the present discussion and are not further discussed. The coherent read transaction is a request to read data from the target system in such a manner that memory hierarchies of the processing systems in the group containing the source and target processing systems are maintained coherent. Maintaining the memory hierarchies of processing systems in the group other than the source and target systems may require further transactions. Similarly, a coherent write is a request to write data to the target system in such a manner that hierarchies of the processing systems in the group containing the source and target processing systems are maintained coherent. Maintaining the memory hierarchies of processing systems in the group other than the source and target systems may require further transactions. An incoherent read is a request to read data from the target system's memory without regard to the coherency of any processing system and in such a manner as to not change the coherency of any processing system as regards the addresses involved in this transaction. Similarly, an incoherent write is a request to write data to the target system's memory without regard to the coherency of any processing system and in such a manner as to not change the coherency of any processing system as regards the addresses involved in this transaction. These transactions and their meanings and implications are well known in the communication art. In addition, two more transaction types may be specified. An I/O read transaction is a request to read data from the target system's memory hierarchy, using the most-current cached copy if one exists (such cached copy may be held in a processing system in the same group as the target processing system), without changing the coherency state of any processing system within the target group's memory hierarchy as regards the address or addresses involved in the transaction. Similarly, an I/O write transaction is a request to write data to the target system's memory hierarchy, invalidating any cached copies within the target group, without otherwise changing the coherency state of the target group's memory hierarchy as regards the address(es) involved in the transaction.

Illustrated in FIG. 4 is a representation of the contents of a fabric transaction as described above. In the illustrated form, the local transaction contains five fields respectively containing predetermined attributes, a transaction type, a source address, a target address, and data if data is required. Included within the attributes field is a number of various identifiers which are not relevant to this discussion, and are thus assumed to be the same as the attributes shown in FIG. 3. The transaction type field again includes information about whether the transaction is a read operation, a write operation, or other types of operation such as responses and cache management operations together with coherency information as for the local transaction. The source address field specifies the address of the source in the form of a Group Number which the originating processing subsystem wishes to use for this transaction and the processing system's identity within that group. The target address field is illustrated as being constructed of three fields which specify the group within the system to which the interconnect fabric 14 should route the fabric transaction, the processing system within the destination group, and the address within the processing system. The data field, when present, contains data for the target agent. Again, some transaction types, such as a read request, do not require data to be present.

The encodings of the attributes field and the transaction type field may or may not be the same between a local transaction and a corresponding fabric transaction. It should also be well understood that it is a matter of design choice as to whether certain information is included in the attributes field versus the transaction type field. It should also be well understood that the illustrated order of the particular fields to form the local transaction and the fabric transaction is arbitrary and may be varied within a system.

Figure 5:
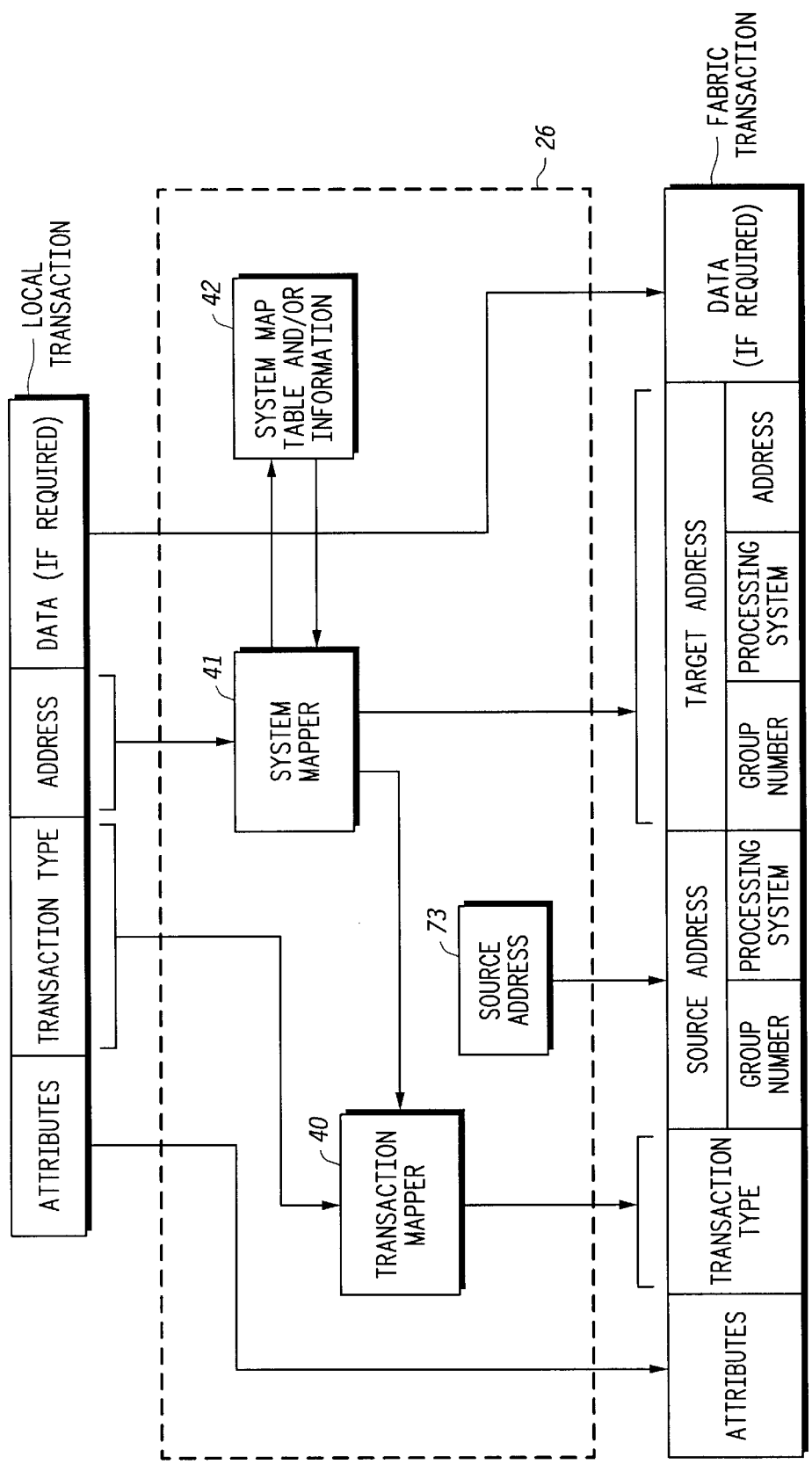
FIG. 5 illustrates in block diagram form an output section of the system interface of the system of FIG. 2.

Illustrated in FIG. 5 is an output portion, designated by a dashed rectangle, of system interface 26 which provides an output Fabric Transaction. Local-to fabric transaction mapper 40, system mapper 41, system map table and/or information 42 and source address register 73 collectively form the output portion of system interface 26 of FIG. 2. A local source transaction of the form shown in FIG. 3 is coupled to the output portion. In particular the transaction type field of the local transaction is connected to an input of a transaction mapper 40. The address field is connected to an input of a system mapper 41. A first output of the system mapper 41 is connected to a second input of transaction mapper 40. An output of transaction mapper 40 provides the transaction type field of the fabric transaction. A second output of the system mapper 41 provides the target address fields of the fabric transaction. The data field, if present, and the attribute field are copied directly into the fabric transaction. A third output of system mapper 41 is connected to an input of a system map table and/or information 42 which has an output connected to a second input of system mapper 41. The source address is copied from the Source Address register 73 to the source address field of the fabric transaction.

In operation, the system mapper 41 functions to selectively use the system map table and/or information 42 in response to receiving and decoding encoded address information. The system mapper 41 may assist the transaction mapper 40 in providing certain information which is utilized by transaction mapper 40 to create the transaction type field of the fabric transaction. Numerous implementations exist to implement the functionality of the system mapper 41 and the transaction mapper 40 and how these mappers work together to effect the desired transformations.

Figure 6:
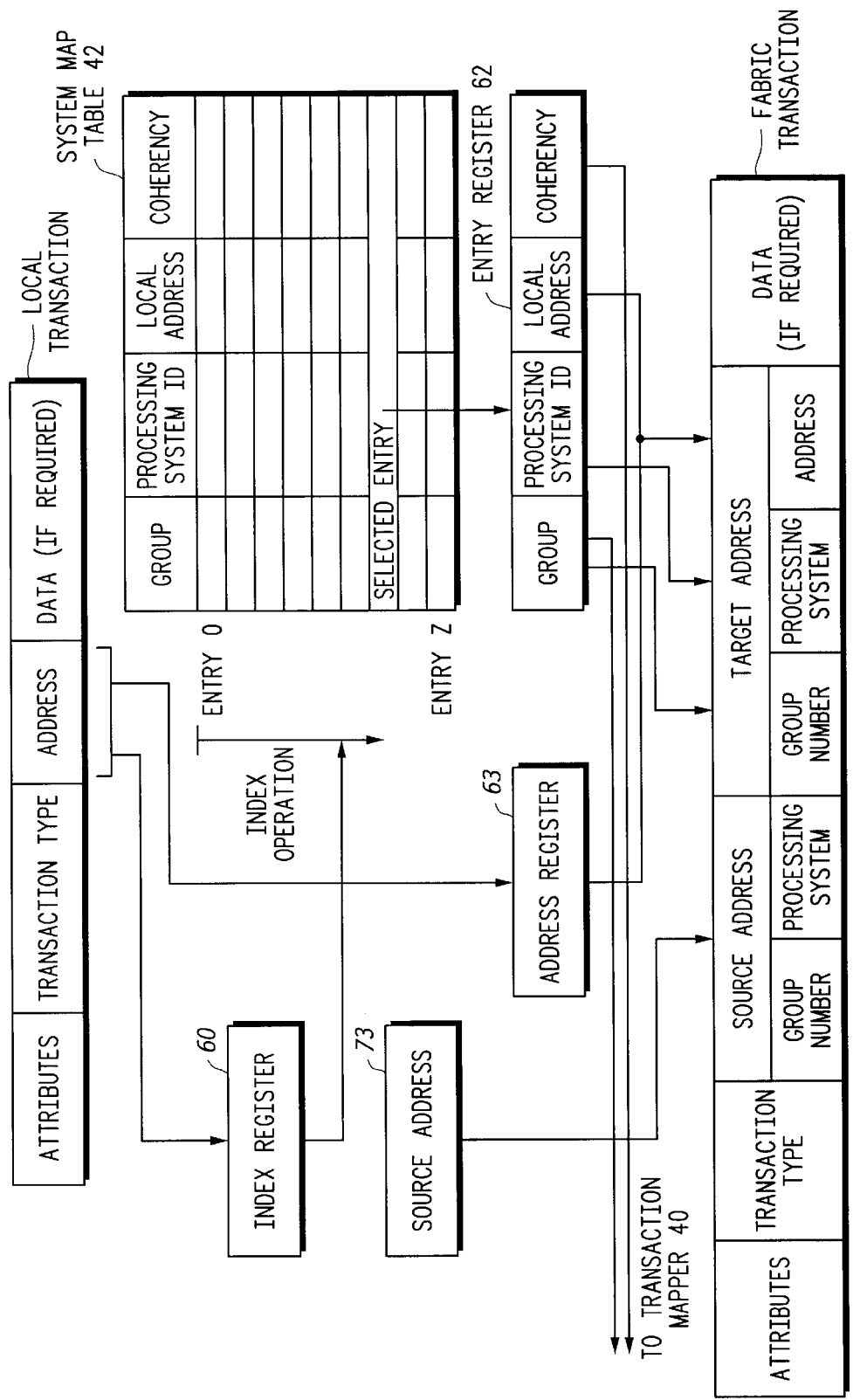
FIG. 6 illustrates in block diagram form details of the system mapping function of the output section of FIG. 5.

To further understand the operation of system mapper 41 and system map table and/or information 42, refer to FIG. 6. The address field of the location transaction is connected to an input of an index register 60. An output of index register 60 is connected to a select control input of system map table 42. The illustrated mapping function implementation is but one of numerous possible implementations and for convenience a simple, but effective, exemplary method is provided herein. In the illustrated form, the system map table 42 is a table in which each entry contains four fields: a Group field, a Processing System Identification (ID) field, a Local Address field and a Coherency field. The entries are numbered sequentially from zero to Z, where Z is an integer. A selected entry of system map table 42 is connected to an entry register 62 which is organized with specific fields. The fields of entry register 62 are a group field, a processing system (PS) identification field, a local address field, and a coherency field. A predetermined portion of the address field of the local transaction is connected to an address register 63. The contents of the address register 63 are concatenated with the local address field of the entry register 62 and placed into an address field (Addr) of the fabric transaction. The group field of the entry register 62 is used form the group field of the address of the fabric transaction, and the processing system identifier of the entry register 62 is used to form the processing system identifier of the address field of the fabric transaction. The contents of the group field and the coherency field of the entry register 62 are connected to transaction mapper 40 of FIG. 5.

In operation, the system mapper 41 extracts from the input address some number of most significant bits and places the result in its index register 60. The remaining bits of the input address are placed in address register 63. The system mapper 41 then selects the entry in the system map table 42 based on the value in the index register 60. System map table 42 then copies the fields of the selected entry to entry register 62. Using address register 63 and entry register 62, the outgoing fabric target address is constructed by placing in the fabric address field of the transaction the Group value and Processing System ID held in entry register 62. The local Address field in the fabric transaction target address field is formed by appending or concatenating the Local Address field value from the entry register 62 to the value in the address register 63. The system mapper 41 then provides to transaction mapper 40 of FIG. 5 the values of the Group field and of the Coherency fields of the entry register 62. In this exemplary description the transaction mapper 40 will accept from the system mapper 41 the target group of the transaction together with the Coherency of that group. The Source Address register 73 provides the source address field of the fabric transaction.

Figure 7:
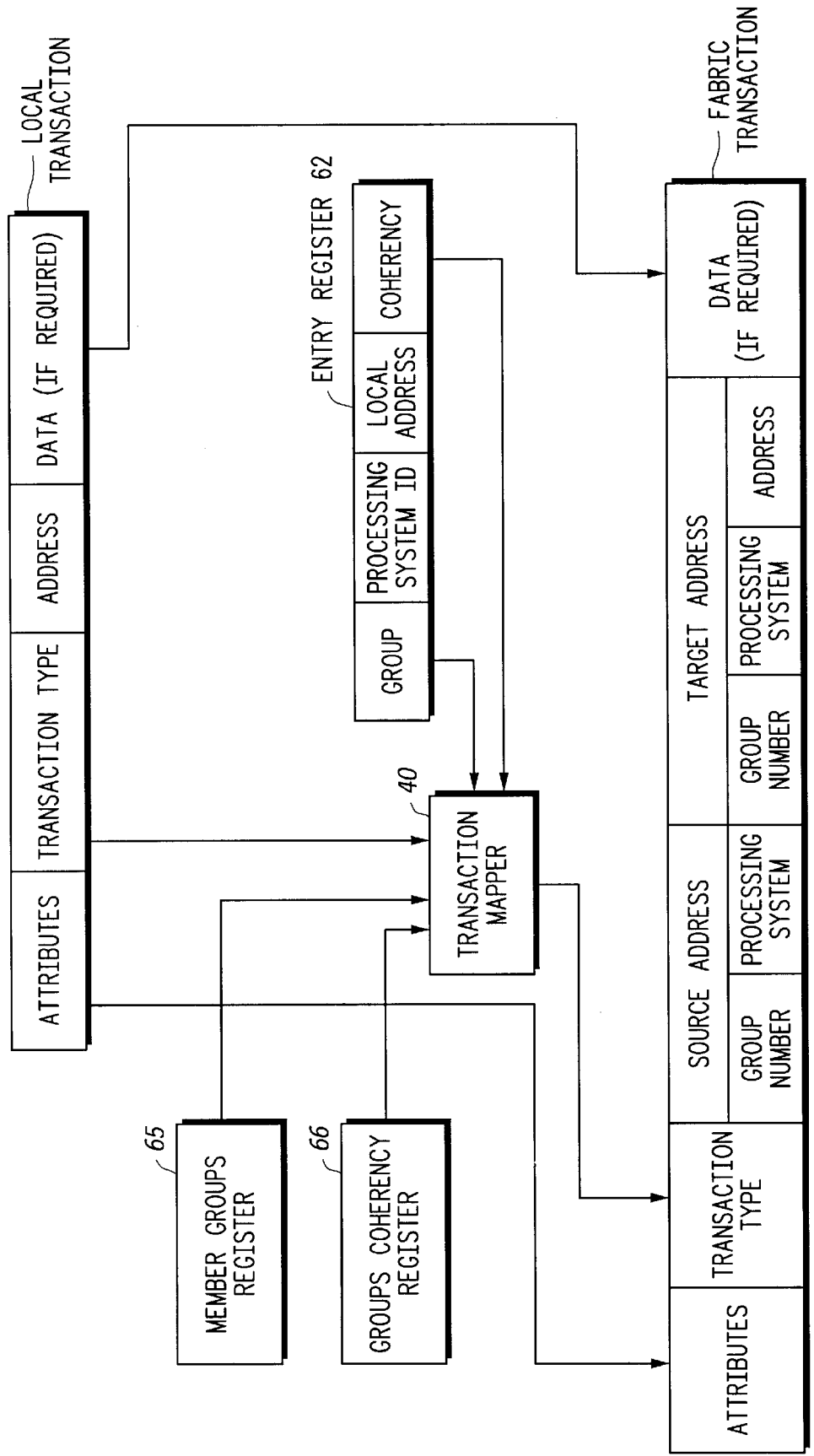
FIG. 7 illustrates in block diagram form details of the transaction mapping function of the output section of FIG. 5

Illustrated in FIG. 7 is a further detail of transaction mapper 40 of FIG. 5 and associated circuitry. Entry register 62 of FIG. 6 is shown in FIG. 7 connected to local-to-fabric transaction mapper 40. The transaction mapper 40 is connected to two additional registers, a member groups register 65 and a groups coherency register 66 which, respectively represent by bit vectors what processing systems are members in each of the system Groups and what the coherency type of each of such Groups is. The transaction mapper 40 will use the information in these registers and the information from the system mapper 41 to construct the attributes and transaction type for the fabric transaction according to the rules in the table of FIG. 8. In other words, the logic circuitry used to implement transaction mapper 40 utilizes the rules provided in FIG. 8. If the transformation is one which results in an error as designated in FIG. 8, no outgoing transaction is generated. Additionally, a local transaction indicating existence of the error is generated. Errors occur where the encodings indicate that the target group is not coherent, but the required transaction must be coherent. It will be seen from the FIG. 8 table that coherent transactions are communicated only to such processing systems as are members of the source group, except that when such members are non-coherent processing systems they are not regarded as members of the source group. An I/O device is an example of a non-coherent processing system within a coherent group. In a system not benefiting from the present invention, the information related to the Groups is omitted and coherent transactions must be transmitted to all processing systems.

To further understand the transaction mappings provided by the table of FIG. 8, a discussion of an I/O read and an I/O write will be beneficial. For an I/O read operation to a target which is non-local (i.e. not contained within the same processing system), the target of the read must not be in the same group, but the target group is coherent. Additionally, the transaction is designated as requiring coherency. In this situation, an input/output read of the information which is processed by the system interface 26 may occur. Similarly, for an I/O write operation to a target which is non-local, the target of the write must not be in the same group. The target group additionally must be coherent and the transaction must be coherent. In that situation, an input/output write of the information which is processed by the system interface 26 may occur.

Figure 9:
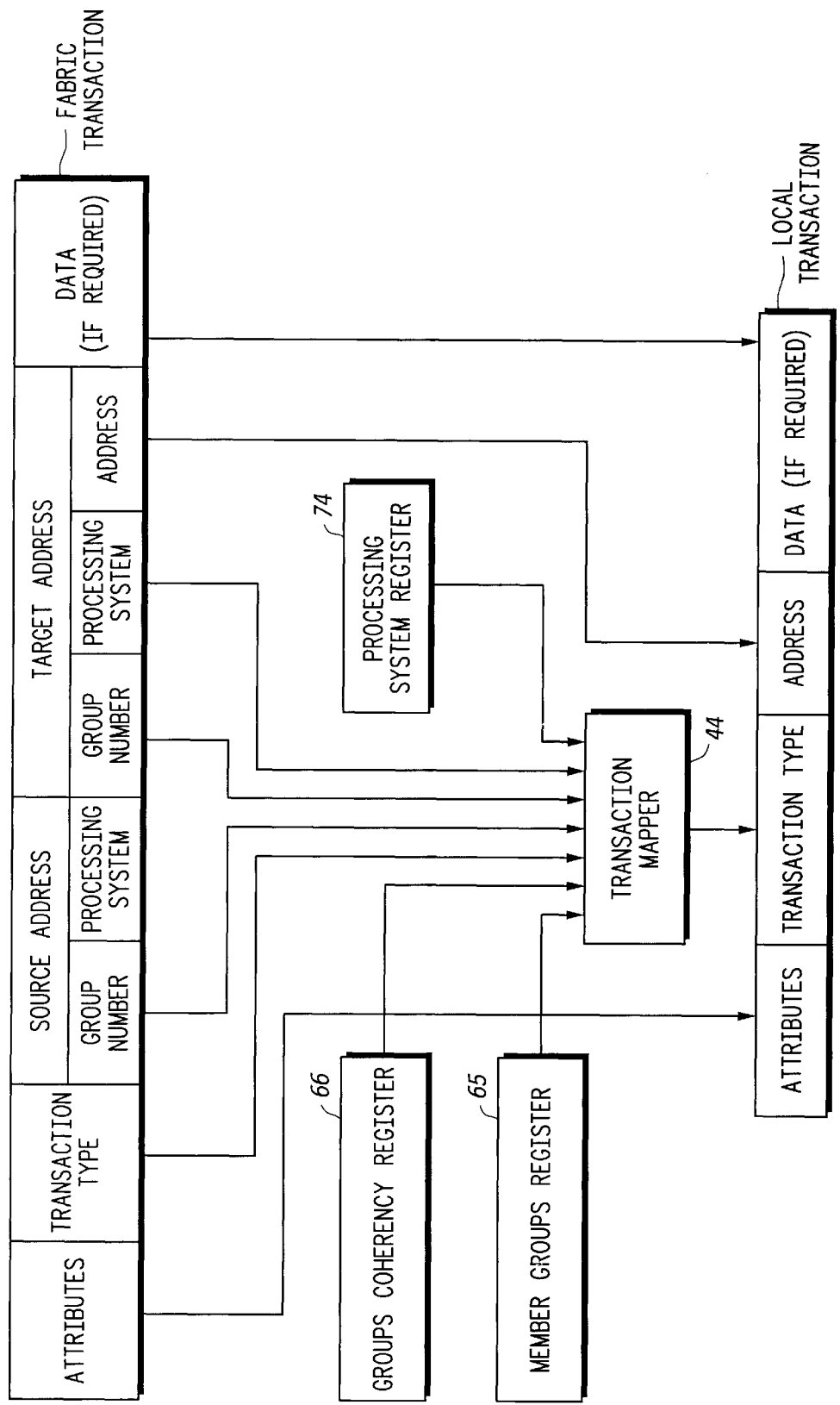
FIG. 9 illustrates in block diagram form an input section of the system interface of the system of FIG. 2.

Illustrated in FIG. 9 is an input portion, designated by a dashed rectangle, of system interface 26 which receives a fabric transaction and converts the fabric transaction to a local transaction. The transaction type field of the received fabric transaction is connected to a first input of a fabric-to-local transaction mapper 44. As will be explained below, transaction mapper 40 and transaction mapper 44 operate differently in performing their respective mapping functions. An output of transaction mapper 44 provides the transaction type field of the local transaction which is generated in response to the received fabric transaction. The local address portion of the target Address field of the fabric transaction is copied to the address field of the local transaction. The attributes field of the fabric transaction is copied to the attributes field of the local transaction. If data is present in the received fabric transaction, the data is connected directly in unmodified form to the attributes, transaction type and address fields of the local transaction to form the complete equivalent local transaction. In operation, the local mapper 45 functions to selectively use the system map table and/or information 42 in response to receiving the destination group number and the destination processing system number. The local mapper assists the transaction mapper in providing certain information which is utilized by transaction mapper 40 to create the attributes field and the transaction type field of the fabric transaction. Local mapper 45 uses the received group number and processing system number to determine if the received fabric transaction is intended for a processing system in which system interface 26 resides. If the numbers do not properly correlate, local mapper 45 signals to transaction mapper 44 to not complete formation of the local transaction. Address mapper 46 performs an address transformation from the address field of the fabric transaction to the address field of the local transaction. The address transformation may include a straight pass-through operation involving no change in the address or may include a static partitioning of the address field where certain portions of the address of the fabric transaction are used. Additionally, the address transformation may include the use of a system map or equivalent information to modify the address field similar to the function of a memory management unit. Local map table 47 provides local mapper 45 with additional information to be used by transaction mapper 44 in forming appropriate local attributes. Such attributes include memory coherency information regarding the two groups and systems which have communicated the fabric transaction. The member groups register 65, initially introduced in connection with FIG. 7, has its output also connected to an input of the fabric-to-local transaction mapper 44. The groups coherency register 66, initially introduced in connection with FIG. 7, has its output also connected to another input of fabric-to-local transaction mapper 44.

In operation, an incoming group field of the Source Address fabric transaction is checked against the contents of the member groups register 65 to determine if the fabric transaction is from a recognized authorized group. In other words, member groups register 65 identifies the groups of which the specific processing system in which transaction mapper 44 is implemented is a member. If there is no match, then an error condition is indicated designating to the system interface that the fabric transaction should not be translated into a local transaction. The incoming processing system identifier from the target address field of the fabric transaction is also compared with values in the processing system ID register 74. Again, if there is no match indicating that the fabric transaction relates to an authorized processing system, then an error is indicated to transaction mapper 44 which will result in there being no valid translation to a local transaction. The local address (Addr) portion of the address field of the fabric transaction is copied to the address field of the local transaction. Similarly, if data is present in the fabric transaction the data is copied to the data field of the local transaction. If the source group matches one of the bits in the member groups register 65, then authorization is granted to permit transaction mapper 44 to use the groups coherency register 66 and the table of FIG. 10 to create the transaction type field for the local transaction.

Illustrated in FIG. 10 is a table which further defines transaction mappings performed by transaction mapper 44 when creating a local transaction from a received fabric transaction. Transaction mapper 44 will implement either a coherent read/write or a non-coherent read/write when the attributes of the fabric transaction indicate that the source processing system is in the same group as the target processing element and that the target processor is in a coherent group depending upon whether the fabric transaction was coherent or non-coherent An error is indicated when the target processing system is designated as not being in a coherent group and the fabric transaction is indicated to be a coherent read or write. An I/O read or write is implemented in response to the target processing system being in a coherent group, but the source processing system is in a different group from the target processing system or is a non-coherent processing system within the target group.

It should be noted that when the interconnect fabric 14 is implemented as an interconnect device or devices, the interconnect circuitry only needs to have logic circuitry capable of identifying a group and a selected processing system. The interconnect fabric 14 does not need to implement specific memory coherency logic circuitry. If interconnect fabric 14 is implemented as a bus or a segmented bus, each system interface of each processing element must have the ability to recognize when it is the intended destination of a transaction placed on the bus.

Multi-processing system 10 is configured so that groups are created based upon the functional requirements and restraints of the system. In other words, a group arrangement is created so that memory coherency, if determined to be required within the group, exists only among the processing systems within that group. Outside of the group, memory coherency is not required. The significance of that system feature is that the interconnect fabric is greatly simplified. Additionally, information transfers which transcend group boundaries may do so without the requirement and overhead of creating a memory coherency system for the entire system, thereby reducing overall system bandwidth requirements and in general reducing access latency.

By now it should be apparent that there has been provided a method and apparatus for efficiently implementing memory coherence in a multi-processing system by establishing two or more groups of processing elements which are independent from each other regarding memory coherence. The method avoids overhead associated with maintaining memory coherency on a system-wide basis.

Various physical implementations of the present invention may be readily utilized. For example, various architectures can be used for the processing systems. The present invention may be implemented on a single integrated chip as a system on a chip or may be implemented using a plurality of discrete processing systems. Further, the present invention may be implemented as an entire system where various processing systems are physically located in close proximity or may be a multi-processing system where certain processing systems are separated by miles. Numerous physical implementations may be created to implement any of the specific logic blocks illustrated in the figures. For example, instead of using a table in FIG. 5, any type of memory storage device or listing may be used. The present invention may be implemented in MOS, bipolar, SOI, GaAs or other types of semiconductor processing. Therefore, it is intended that this invention encompass all such variations and modifications as fall within the scope of the appended claims.

What is claimed is:

1. A multi-processing system comprising:

two or more groups of processing elements, each processing element of each group being coupled by an interconnect and each processing element of each group communicating information in accordance with a single communications protocol;

a memory contained within each of the processing elements, wherein memory coherency, if established in any one of the two or more groups, is maintained independently within each group, each processing element communicating information within itself using a first transaction format comprising a transaction type field and a target address field; and system interface circuitry contained within each of the processing elements, the system interface circuitry creating a second transaction format for communication external to a processing element, the second transaction format having more information fields than the first transaction format, the second transaction format comprising a source address field and a target address field.

2. The multi-processing system of claim 1 wherein the interconnect further comprises logic circuitry capable of identifying a group and a selected processing system.

3. The multi-processing system of claim 1 wherein each processing element of each group in which memory coherency is established further comprises:

output logic within the system interface circuitry for receiving an input transaction having the first transaction format and using the input transaction to assemble an output transaction having encoded information which designates where the output transaction is to be routed by the interconnect, a type of operation the output transaction implements, and whether or not memory coherency is to be maintained by a destination processing element within a predetermined group that the destination processing element has assigned.

4. The multi-processing system of claim 1 wherein each processing element of each group in which memory coherency is established further comprises:

input logic within the system interface circuitry for receiving an input transaction from another processing element of the multi-processing system, the input logic parsing the input transaction to confirm whether the input transaction is properly routed to an intended processing element, to determine what type of operation the input transaction represents, and to determine if the input transaction was provided by a processing element in which memory coherency is implemented.

5. A method for selectively implementing memory coherency, comprising:

creating a multi-processing system by providing two or more groups of processing elements, each processing element communicating information within itself using a first transaction format comprising a transaction type field and a target address field and forming a second transaction format for communication external to each processing element, the second transaction format comprising more fields than the first transaction format and designating where the output transaction is to be routed, a type of operation the output transaction implements and whether or not memory coherency is to be maintained by a destination processing element;

coupling each of the processing elements of each group by an interconnect which communicates information among all processing elements of the two or more groups of processing elements by using a single communications protocol;

providing a memory within each of the processing elements; and selectively determining which, if any of the two or more groups of processing elements will have coherent memory, wherein memory coherency, if established in any one of the two or more groups, is maintained independently within each group.

6. A multiple processing element system comprising:

a first group of processing elements, each processing element of the first group having a main memory and a cache memory and being coupled by an interconnect for communicating information using a transaction format, wherein either the interconnect or each processing element of the first group of processing elements uses the transaction format to identify a destination group of processing elements and a selected processing system; and a second group of processing elements, each processing element of the second group being coupled by the interconnect, wherein at least one processing element in the multiple processing element system is a member of both the first group of processing elements and the second group of processing elements, the first group having processing elements determined by a first set of criteria which differs from a second set of criteria which is used to determine processing element membership of the second group.

7. The multiple processing element system of claim 6 wherein the interconnect couples communication transmissions between the first group of processing elements and the second group of processing elements by using a single communication protocol.

8. The multiple processing element system of claim 6 wherein the first group of processing elements has a different memory coherency than the second group of processing elements.

9. The multiple processing element system of claim 6 wherein the system is memory noncoherent.

10. A multiple processing element system comprising:

a first group of processing elements, each processing element of the first group communicating information within itself using a first transaction format comprising a transaction type field and a target address field and being coupled by an interconnect, and the first group of processing elements implementing memory coherency within the first group of processing elements, the first group of processing elements communicating information external to each processing element by using a second transaction format comprising more information fields than the first transaction format and comprising a source address field and a target address field; and a second group of processing elements, each processing element of the second group being coupled by the interconnect, wherein the second group of processing elements implements memory coherency within the second group of processing elements, wherein at least one processing element in the multiple processing element system is a member of both the first group of processing elements and the second group of processing elements.

11. The multiple processing element system of claim 10 wherein the interconnect couples each processing element of both the first group of processing elements and the second group of processing elements using a single, common interconnect protocol.

12. The multiple processing element system of claim 11 wherein the second transaction format further comprises at least a field which identifies a type of transaction and the target address defines: (1) a group of processing elements for which a predetermined transaction is targeted; (2) a processing system for which a predetermined transaction is targeted; and (3) a memory address within the processing system for which the predetermined transaction is targeted.

13. The multiple processing element system of claim 12 where at least one of the first transaction format or the second transaction format further comprises an attributes field containing predetermined transaction attributes and a data field when data is associated with the predetermined transaction.

* * * * *

UNITED STATES PATENT AND TRADEMARK OFFICE
CERTIFICATE OF CORRECTION

PATENT NO. : 6,754,752 B2  
APPLICATION NO. : 09/758856  
DATED : June 22, 2004  
INVENTOR(S) : Bryan D. Marietta Page 1 of 1

It is certified that error appears in the above-identified patent and that said Letters Patent is hereby corrected as shown below:

In Column 12, Line 15, Claim No. 10:

Delete the word "and" after the word – "interconnect,"

Signed and Sealed this

Tenth Day of October, 2006

JON W. DUDAS  
*Director of the United States Patent and Trademark Office*